Sept. 2, 1947.    W. S. WILSON    2,426,910
MEASUREMENT OF TIME BETWEEN PULSES
Filed Jan. 27, 1944
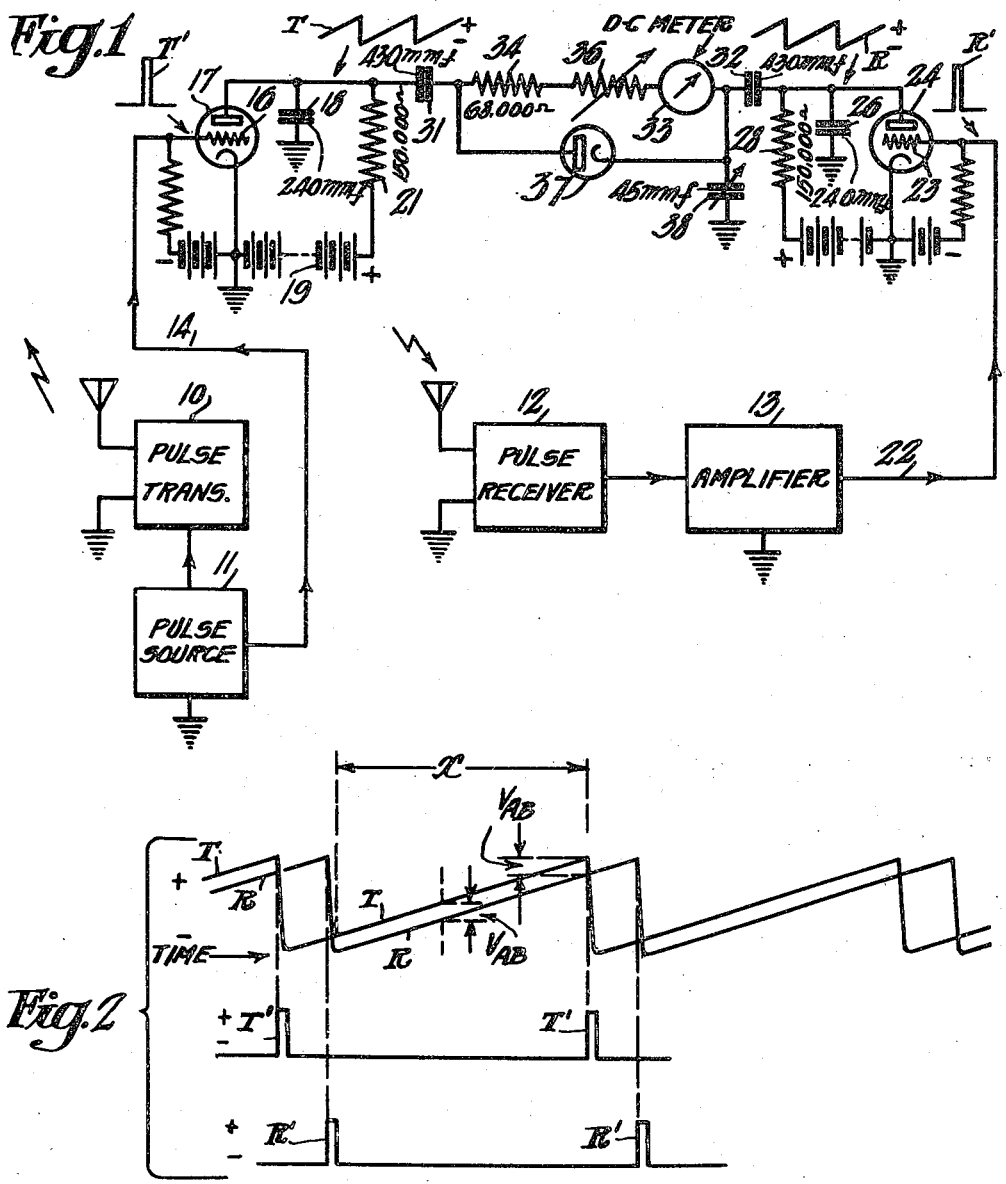

Patented Sept. 2, 1947

2,426,910

UNITED STATES PATENT OFFICE 2,426,910

MEASUREMENT OF TIME BETWEEN PULSES

William S. Wilson, Haddonfield, N. J., assignor to Radio Corporation of America, a corporation of Delaware Application January 27, 1944, Serial No. 519,876

4 Claims. (Cl. 175—381)

The invention covered herein may be manufactured and used by or for the Government of the United States for any governmental purpose without payment to me or assigns of any royalty thereon.

My invention relates to the measurement of the time interval between electrical pulses. It will be particularly described as applied to a pulse-echo distance measuring system for determining the time interval between the transmission of a pulse and the reception of the pulse after reflection from a target or other reflecting object or surface.

One object of the invention is to provide an improved circuit which will give a meter reading of or proportional to the time interval between successive electrical pulses.

Another object of the invention is to provide an improved distance indicating circuit for a pulse-echo system.

Still another object of the invention is to provide an improved method of and means for measuring the time interval between electrical pulses.

In a preferred embodiment of the invention the two pulses, such as the transmitted pulse and the reflected pulse, are each integrated or otherwise converted to sawtooth waves. The two saw-tooth waves are then applied in phase opposition to a suitable unidirectional voltage measuring meter or circuit whereby the difference in the instantaneous amplitude of the sawtooth waves is measured. This voltage difference depends upon the phase difference of the two sawtooth waves which, in turn, depends upon the time interval between successive applied pulses. Thus, the meter may be calibrated to read directly in time interval between pulses or, in the case of a distance measuring system, to read directly in distance.

The invention will be better understood from the following description taken in connection with the accompanying drawing in which Figure 1 is a circuit diagram of a preferred embodiment of the invention, and Figure 2 is a group of graphs that are referred to in explaining the operation of the circuit shown in Fig. 1.

Fig. 1 shows the invention applied to a pulse-echo system comprising a radio pulse transmitter 10, a source 11 of modulating pulses T', a radio pulse receiver 12 and a video-frequency pulse amplifier 13. The modulating pulses T' are applied over a conductor 14 to the grid 16 of a vacuum tube 17 at substantially the same time that the corresponding radio pulse is transmitted from the transmitter 10. The pulses T' are converted to sawtooth voltage waves T as follows: A capacitor 18 in the anode circuit is slowly charged by an anode voltage source 19 through a high impedance resistor 21 and is suddenly discharged through the tube 16 as soon as the front edge of a pulse T' drives the grid 16 in the positive direction.

Similarly, the amplified reflected pulses R' are supplied from the amplifier 13 over a conductor 22 to the grid 23 of a vacuum tube 24 for converting the pulses R' to sawtooth voltage waves R. The circuit for producing the waves R comprises the tube 24, a capacitor 26 in its anode circuit, an anode voltage source 27 and a high impedance resistor 28. This circuit produces the sawtooth waves R in the same manner the sawtooth waves T are produced.

The instantaneous voltage difference $V_{AB}$ between the sawtooth waves T and R depends upon the amount that wave R is delayed with respect to wave T. This is evident from an inspection of the graphs in Fig. 2. The voltage difference $V_{AB}$ is measured by applying the waves T and R through coupling capacitors 31 and 32, respectively, to opposite sides of a voltage measuring circuit comprising a direct-current milliammeter 33, resistors 34 and 36, and a rectifier such as a diode 37 connected across the meter 33 and the resistors 34 and 36. In the example illustrated, the diode 37 is connected so that the wave T is applied to the anode 40 of the diode 37.

The variable resistor 36 is adjusted to make the maximum reading of the meter 33 the desired value. A variable capacitor 38 may be connected between the meter end of capacitor 32 and ground for adjusting the amplitude of the sawtooth wave R as applied to the meter circuit so that it is exactly equal to the amplitude of the sawtooth wave T whereby the reading of meter 33 is zero if the two sawtooth waves are in phase. The relative amplitudes of the sawtooth waves R and T may be adjusted in other ways, if preferred, as will be apparent to those skilled in the art.

It will be noted that the capacitors 32 and 38 form a capacitor potentiometer connected across the capacitor 26. Most of the sawtooth voltage R appears across the smaller capacitor 38, this being the voltage that is effectively applied to the meter circuit since it appears between one end of the meter circuit and ground. It will be apparent that the voltage wave T appears between the other end of the meter circuit and ground, Because of the diode 37, rectified current flows through the meter 33 in the direction to give a meter reading, this current flow corresponding to the time that the instantaneous voltage of the sawtooth wave T is positive with respect to that of the sawtooth wave R. When the phase difference of the two waves is that shown in Fig. 2, the above-mentioned current flow through the meter 33 and through the diode 37 corresponds to the period X.

Some of the circuit values are indicated in ohms and micromicrofarads on the drawing merely by way of example for one particular application of the invention. In this example, the pulses T' occur at a rate of about 100,000 pulses per second, the pulse width is 0.5 microsecond, and the sawtooth "return-line" period is about 0.02 microsecond.

It will be understood that the meter 33 preferably is damped sufficiently to give a steady reading even though the unidirectional current is flowing periodically at the pulse rate. It may be noted that the duration of each pulse of current through the meter 33 decreases as the phase (and voltage) difference between the waves T and R increases but this is immaterial as the complete meter circuit comprising the diode 37 and the D.-C. meter 33 is substantially a peak current or peak voltage measuring device. Furthermore, if the meter 33 is properly calibrated, the calibration takes into account any effect that this decrease in the duration of current flow may have.

It will be apparent that my invention may be employed for measuring the phase angle between sawtooth waves that may have been produced in any manner and which are to be applied to utilization circuits such as cathode ray deflecting means.

I claim as my invention:

1. The method of measuring the lag interval between corresponding pulses of two series of pulses of the same frequency, which comprises producing in response to each series of pulses a sawtooth voltage wave, said waves being of the same amplitude and frequency and of like polarity and form and one of them lagging the other by the same lag interval, and measuring the instantaneous voltage difference between said waves only during the intervals when the voltage of a certain one of said waves exceeds that of the other.

2. In a circuit for measuring the time lag interval between corresponding pulses of two series of pulses of the same frequency, means including a capacitor for producing a sawtooth wave across said capacitor in response to the application of one of said pulses, means including a capacitor for producing a second sawtooth wave across said second capacitor in response to the application of the other of said pulses, each of said capacitors having a grounded terminal and a high potential terminal, and a unidirectional voltage measuring device connected between the high potential terminals of said capacitors.

3. In a circuit for measuring the time lag interval between corresponding pulses of two series of pulses of the same frequency, a capacitor, means for charging and discharging said capacitor for producing a sawtooth wave across said capacitor in response to the application of one of said pulses, a second capacitor, means for charging and discharging said second capacitor for producing a second sawtooth wave across said second capacitor in response to the application of the other of said pulses, each of said capacitors having a low potential terminal and a high potential terminal, said low potential terminals being connected to a common point such as ground, and a unidirectional voltage measuring device connected between the high potential terminals of said capacitors.

4. In a circuit for measuring the time lag interval between corresponding pulses of two series of pulses of the same frequency, means including a capacitor for producing a sawtooth wave across said capacitor in response to the application of one of said pulses, means including a capacitor for producing a second sawtooth wave across said second capacitor in response to the application of the other of said pulses, each of said capacitors having a grounded terminal and a high potential terminal, a direct-current voltmeter connected between the high potential terminals of said capacitors, and a diode connected across said voltmeter.

WILLIAM S. WILSON.

REFERENCES CITED

The following references are of record in the file of this patent:

UNITED STATES PATENTS

| Number | Name | Date |
| --- | --- | --- |
| 2,227,815 | Toulon | Jan. 7, 1941 |
| 2,287,174 | Heising | June 23, 1942 |
| 2,320,476 | Schrader et al. | June 1, 1943 |
| 2,250,708 | Herz | July 29, 1941 |
| 2,321,581 | Conover | June 15, 1943 |